July 23, 1957     S. GILMAN     2,800,590
RADIATION MEASURING SYSTEM FOR MATERIAL
HAVING NON-UNIFORM CROSS-SECTION DESIGN
Filed Dec. 19, 1955
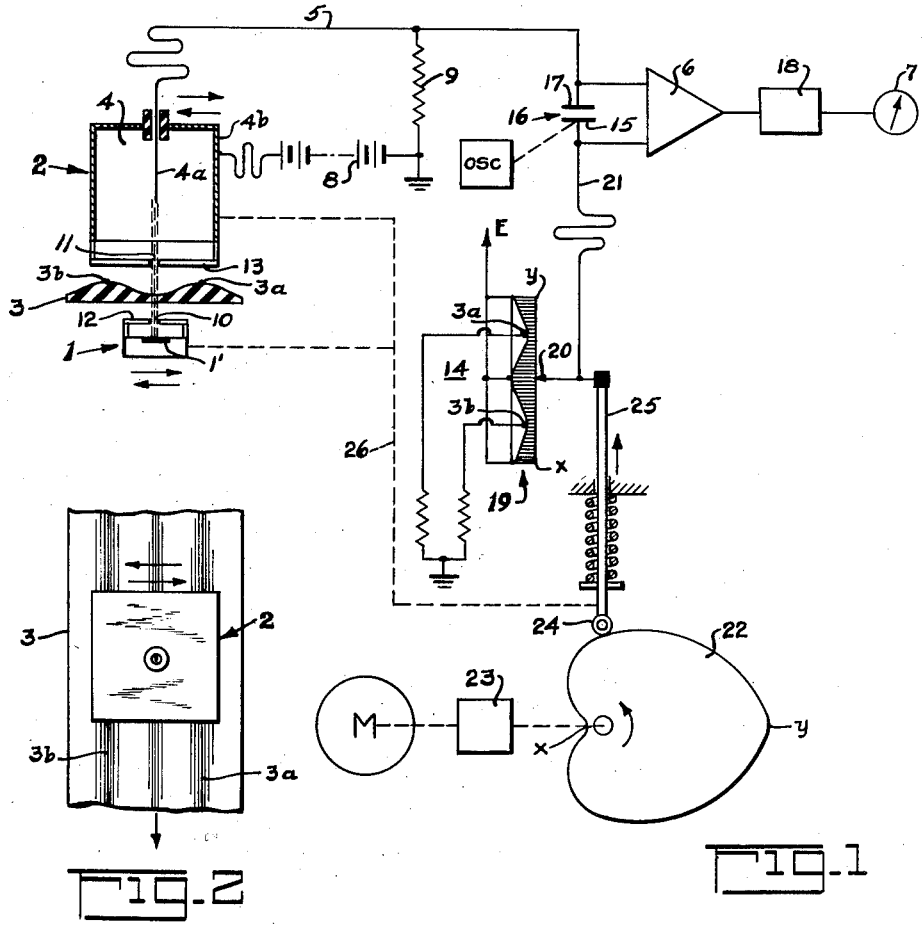
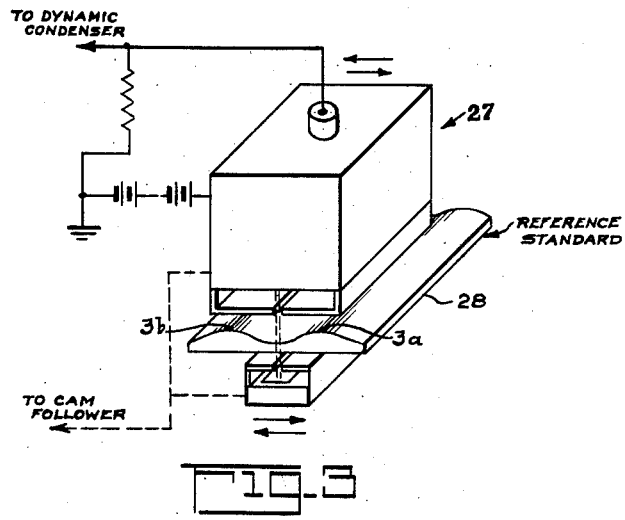
INVENTOR,
SAMUEL GILMAN
BY
his ATTORNEY United States Patent Office 2,800,590
Patented July 23, 1957

2,800,590

RADIATION MEASURING SYSTEM FOR MATERIAL HAVING NON-UNIFORM CROSS-SECTION DESIGN

Samuel Gilman, Maplewood, N. J., assignor to Curtiss-Wright Corporation, a corporation of Delaware Application December 19, 1955, Serial No. 553,847

11 Claims. (Cl. 250—83.6)

This invention relates to radiation measuring systems for determining the deviation from a reference standard of thickness or density of a material to be measured, and has particular application to the non-contact measurement of continuously producing strip material or the like, of non-uniform cross-section.

Material of this character such as plastics, composite laminated material, etc., is commonly produced in forms of non-uniform cross-sectional areas by extrusion or other suitable processes. Therefore it is highly important that the desired or standard cross-sectional characteristics, either as to thickness or density, be maintained within the limits of manufacturing tolerances without interrupting the continuous process.

Radiation measuring equipment heretofore available for the non-contact measurement of thickness or density of continuously produced strip material is limited in practical application to material having substantially uniform cross-sectional areas. That is, the strip material in such cases is generally in the form of a sheet or web of desired uniform thickness or density. However in cases where the cross-section must conform to a non-uniform standard, a radically different problem obviously is presented. A principal object of the invention therefore is an improved radiation measuring system that is operable continuously to measure deviation of thickness or density from a variable reference standard throughout an entire non-uniform cross-section of the material to be measured.

In accordance with a preferred form of my invention the material to be measured is fed continuously to a radiation measuring device of the radiation absorption type where the material is scanned transversely of its length, i. e. length in the direction of material movement, by the radiation measuring device which is calibrated to measure deviation at any point in the transverse cross-section with reference to a standard pattern or sample. The comparison measurements taken during the scanning operation may be represented by error signals that are used in conventional manner to control suitable, indicating, recording and/or production control apparatus for the material.

The invention will be more fully set forth in the following description referring to the accompanying drawing, and the features of novelty will be pointed out with particularity in the claims annexed to and forming a part of this specification.

Referring to the drawing, Fig. 1 is a partly diagrammatic and schematic illustration of a preferred form of my invention using a function generator as the reference standard; Fig. 2 is a plan view (from above) indicating relative scanning and material movements of the ionization chamber and strip material respectively in Fig. 1; and Fig. 3 is a partly schematic illustration in perspective of an alternative form of reference standard wherein a second or duplicate ionization chamber is used in connection with a standard sample of the material to be measured.

The radiation measuring system schematically illustrated in Fig. 1 comprises a source of radiation generally indicated at 1, and a radiation detector 2 of suitable type spaced, as indicated, by an air gap from the source. Within the air gap is disposed for continuous lengthwise movement material to be measured in respect to thickness or density, as the case may be. In the present instance the material 3 which may be paper, plastics, etc., has a non-uniform cross-section as shown and is of strip form arranged continuously to move through the gap as it is produced. In this type of system the radiation from the source 1, which may be a radioactive isotope 1' emitting beta rays, penetrates the strip material where it is partially absorbed, depending on the mass of the material, and the unabsorbed radiation enters the detector 2. Where the character of the material requires, a source of gamma radiation may be used.

The detector 2 by way of example may comprise an ionization chamber 4 of well-known type having a probe electrode 4a and a conducting wall 4b forming the other or positive electrode. The electrodes are connected in conventional manner through circuitry 5 to an amplifier 6 which energizes a calibrated indicator 7. A high D. C. potential indicated at 8 is impressed on the wall electrode 4b and is connected as illustrated to a grounded resistor 9 which completes an external circuit with the electrode 4a. The lower wall of the ionization chamber 4 is provided with suitable glass-sealed apertures (not shown) through which radiation enters the chamber causing ionization with resulting current flow through the external circuit including the resistor 9 according to the intensity of radiation entering the chamber. Thus, the amplifier 6 is responsive to the potential difference across resistor 9 and, since this potential difference is proportional to the radiation received by the detector, the indicator 7 can be calibrated in terms thereof. For convenience in terminology the source and detector combination will be referred to as the radiation instrument.

Although a simple indicating system is illustrated, it should be understood that the signal from the amplifier 6 can be used either to indicate the departure of the thickness or density of the material 3 from a predetermined value or may also by well-known means control a recorder, as well as the production of said material so as to correct the error in thickness or density.

The apparatus so far described is adapted simply to indicate the mass or thickness of a given section of material in the air gap of the radiation instrument. For comparison of the entire non-uniform cross-section of material 3 with a reference standard, the instrument is suitably mounted on a carriage or the like (not shown) so that the radiation source and detector can be moved together as a unit slowly across a transverse section of the material in a continuous scanning operation, and the resulting signals from the detector are continuously compared with synchronized signals representing the desired or standard cross-section. Fig. 2 illustrates the relative movement of the strip material with respect to the scanning movement of the measuring instrument.

As it is desirable during the scanning operation to measure limited or discrete sections of the non-uniform cross-section in order to obtain good definition or resolution of the complete contour or cross-section with reference to the standard pattern, the radiation from source 1 is focused in a narrow knife-like beam through the material and into the detector. The focusing means may comprise for example longitudinal slots 10 and 11 formed by shutters 12 and 13 mounted in fixed relation above the source and at the entrance of the detector respectively. Accordingly, as the instrument is moved (by means presently described) in its scanning course the detail cross-section of the material 3 may be more or less minutely measured, depending on the width of the slits, for obtaining the required definition of the cross-section.

The standard or reference comparison signal may be produced by a function generator of any suitable type or by a duplicate scanning instrument opeating on a standard sample of the material. In Fig. 1 a function generator 14 is illustrated for feeding a reference signal representing the required standard to the plate 15 of a dynamic condenser 16 connected to the amplifier 6. The measured signal from the radiation instrument representing the actual thickness or density of the material is impressed on the other plate 17 of the condenser. The plate 15 is vibrated by an oscillator OSC as indicated so that an A. C. voltage varying in magnitude according to the difference between the two D. C. signals impressed on the plates 15 and 17 respectively, and in phase according to the predominant signal, is impressed across the input terminals of the amplifier 6. When the thickness or density of the material at a given point conforms to the standard, the two D. C. signals are equal and the A. C. signal is zero. The A. C. signal is amplified and converted to a D. C. signal variable in magnitude and polarity by a phase sensitive rectifier 18 for controlling in well-known manner an indicator, recorder or other apparatus. Apparatus involving operation of a dynamic condenser of the above type is shown for example in Palevsky et al. Patent No. 2,613,236.

The function generator 14 shown by way of example comprises a potentiometer 19 that is designed so that the derived voltage at the slider or brush contact 20 varies according to the brush travel across the potentiometer in the same manner as the cross-section thickness of the material 3 across its width is intended to vary. Assuming that the material has two intermediate high points 3a and 3b which gradually slope toward low points as indicated according to any desired relationship, it will be apparent that the ionization chamber current, and hence the signal at the dynamic condenser plate 17, will be a minimum for the thicker, i. e. high, points and a maximum for the thinner, i. e. low, points. Therefore the potentiometer is correspondingly designed for the comparison signals so that predetermined maximum voltages from D. C. source E are derived at points corresponding to the low points, and vice versa. Potentiometers of this type are well-known in the art, it being sufficient to note that a suitably contoured insulating card is wound with fine resistance wire, mounted on an insulating support for cooperation with a brush contact and tapped for voltage and ground connections.

The brush contact 20, which is electrically connected by conductor 21 to the opposite dynamic condenser plate 15 is operated back and forth through the potentiometer range by suitable means synchronized with the scanning movement of the radiation measuring instrument. A simple device shown by way of example for this purpose may comprise a cam 22 that is operated by a constant speed motor M through a gear reducer 23. The cam is preferably designed so that the cam follower 24 has reciprocal, substantially constant speed motion. The cam follower rod 25 to which the brush 20 is connected as indicated may also be mechanically connected by suitable means generally indicated at 26 to the radiation measuring instrument. Thus the constant speed cam is effective to operate in synchronism both the measuring instrument and the function generator for insuring correct comparison of signals at the dynamic condenser 16.

In Fig. 3 an alternative form for producing the standard reference signal is illustrated. Here, a duplicate radiation measuring instrument 27 is used for scanning a standard sample 28 of the material with respect to its transverse cross-section. The signal produced by the duplicate instrument is produced in the same manner as in the measuring instrument of Fig. 1 and is fed to the plate 15 of the dynamic condenser 16 in place of the signal from the function generator. The duplicate instrument and the original instrument may both be controlled by the cam 22 for synchronous scanning operation. In this arrangement the radiation source and detector of the original and duplicate instruments must of course have similar matched characteristics.

It should be understood that this invention is not limited to specific details of construction and arrangement thereof herein illustrated, and that changes and modifications may occur to one skilled in the art without departing from the spirit of the invention.

What is claimed is:

1. Apparatus for measuring the cross-section characteristics as to thickness or density of continuously produced strip material normally having a non-uniform cross-section comprising a radiation instrument to which the material is directed having a source of radiation disposed so that the material to be measured is subjected to penetrative radiation from said source and a radiation detector disposed in operative relation to said material and said source for receiving radiation unabsorbed by said material and producing a signal according to the received radiation, and means for continuously measuring the cross-sectional characteristics of the material with reference to a predetermined non-uniform standard comprising means for producing relative movement between the radiation instrument and material in a scanning operation transversely of the material so that the detector signal varies according to said cross-section characteristics, means for producing in synchronism with said scanning operation reference signals representing the desired cross-section characteristics of said material, and means for comparing said detector and reference signals and deriving a resultant signal representing in sense and magnitude the deviation from standard of said cross-section characteristics at defined points along the transverse scanned path.

2. Apparatus for measuring the cross-section characteristics as to thickness or density of continuously produced strip material normally having a non-uniform cross-section comprising a radiation instrument to which the material is directed having a source of radiation and a radiation detector for receiving radiation unabsorbed by said material and producing a signal according to the received radiation, and means for continuously measuring the cross-sectional characteristics of the material with reference to a predetermined non-uniform standard comprising operating means for moving the radiation instrument in a scanning operation transversely of the material so that the detector signal varies according to said cross-section characteristics, means controlled by said operating means for producing in synchronism with said scanning operation reference signals representing the desired cross-section characteristics of said material, and means for comparing said detector and reference signals and deriving a resultant signal representing in sense and magnitude the deviation from standard of said cross-section characteristics at defined points along the transverse scanned path.

3. Apparatus for measuring the cross-section characteristics as to thickness or density of continuously produced strip material normally having a non-uniform cross-section comprising a radiation instrument to which the material is directed having a source of radiation and a radiation detector constituting an ionization chamber for receiving radiation unabsorbed by said material so as to produce a signal according to the received radiation, and means for continuously measuring the cross-sectional characteristics of the material with reference to a predetermined non-uniform standard comprising operating means for moving the radiation instrument in a scanning operation transversely of the material so that the detector signal varies according to said cross-section characteristics, a function generator controlled by said operating means for producing in synchronism with said scanning operation reference signals representing the desired cross-section characteristics of said material, and circuitry including a dynamic condenser responsive to said detector and reference signals respectively for deriving a resultant signal representing in sense and magnitude the deviation from standard of said cross-section characteristics at defined points along the transverse scanned path.

4. Radiation measuring apparatus as specified in claim 1 wherein the radiation instrument and the means for producing reference signals are interrelated and operated for synchronous movement.

5. Radiation measuring apparatus as specified in claim 1 wherein the radiation instrument is movable as a unit for scanning the material and is mechanically interrelated by operating mechanism to the means for producing the reference signals for synchronous operation therewith.

6. Radiation measuring apparatus as specified in claim 1 wherein the means for producing the reference signals comprises a function generator.

7. Radiation measuring apparatus as specified in claim 1 wherein the means for producing the reference signals comprises a duplicate matched radiation instrument operable on a standard sample of the material.

8. Radiation measuring apparatus as specified in claim 1 wherein the means for producing reference signals comprises a potentiometer device having characteristics corresponding to the desired cross-section of the material, said potentiometer having operating means connected to the radiation instrument for synchronous operation therewith.

9. Radiation measuring apparatus as specified in claim 1 wherein the signals are voltages, having voltage comparing and resolving means responsive to the detector and reference voltages respectively for producing a resultant voltage variable in sense and magnitude according to the difference between the detector and reference voltages.

10. Radiation measuring apparatus as specified in claim 1 wherein the comparing means comprises a dynamic condenser to the opposite plates of which are fed the detector and reference signals respectively, said condenser being connected to amplifier and resolving means for producing a resultant signal variable in sense and magnitude according to the difference between said detector and reference signals.

11. Radiation measuring apparatus as specified in claim 1 having means for focusing the radiation in a narrow thin beam into a restricted cross-section of the material to be measured for determining the resolution of the cross-section measurement.

No references cited.